(12) United States Patent
Liao et al.

(10) Patent No.: US 11,513,401 B2
(45) Date of Patent: Nov. 29, 2022

(54) LIQUID CRYSTAL DISPLAY MODULE AND DISPLAY DEVICE HAVING CONTACT SURFACE DISPOSED OBLIQUELY TO ANY SIDE SURFACE OF ARRAY SUBSTRATE

(71) Applicant: TCL China Star Optoelectronics Technology Co., Ltd., Shenzhen (CN)

(72) Inventors: Huihua Liao, Shenzhen (CN); Qingyong Zhu, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 279 days.

(21) Appl. No.: 16/625,803

(22) PCT Filed: Nov. 12, 2019

(86) PCT No.: PCT/CN2019/117527
§ 371 (c)(1),
(2) Date: Dec. 23, 2019

(87) PCT Pub. No.: WO2021/047017
PCT Pub. Date: Mar. 18, 2021

(65) Prior Publication Data
US 2021/0356782 A1 Nov. 18, 2021

(30) Foreign Application Priority Data
Sep. 11, 2019 (CN) .......................... 201910857234.0

(51) Int. Cl.
*G02F 1/1345* (2006.01)
*G02F 1/1335* (2006.01)

(52) U.S. Cl.
CPC ...... *G02F 1/1345* (2013.01); *G02F 1/133514* (2013.01); *G02F 2201/56* (2013.01)

(58) Field of Classification Search
CPC combination set(s) only.
See application file for complete search history.

(56) References Cited

U.S. PATENT DOCUMENTS

2001/0009299 A1 7/2001 Saito
2013/0182199 A1* 7/2013 Hosoya ............. G02F 1/134309
349/61

(Continued)

FOREIGN PATENT DOCUMENTS

| CN | 101013707 | 8/2007 |
| CN | 106383555 | 2/2017 |

(Continued)

OTHER PUBLICATIONS

Hu et al. "Research Status and Perspective of CoF Package Technology for LCD Drive IC", CNKI, 3P. Abstract, Jun. 2015.

(Continued)

*Primary Examiner* — Lauren Nguyen
(74) *Attorney, Agent, or Firm* — PV IP PC; Wei Te Chung; Ude Lu

(57) ABSTRACT

A liquid crystal display module and a display device are provided. An end surface of a binding terminal is combined with an end surface of an array substrate to form a contact surface. The contact surface is disposed obliquely to any side surface of the array substrate. A conductive film is fit to and electrically connected with the contact surface. By increasing area of the contact surface between the binding terminal and the first conductive film, a contact resistance can be effectively reduced. The flip-chip film is bent at least twice to reduce a damage to the flip-chip film during bending.

18 Claims, 10 Drawing Sheets

(56) References Cited

U.S. PATENT DOCUMENTS

| | | | |
|---|---|---|---|
| 2014/0085585 A1* | 3/2014 | Sung | G02F 1/13458 349/143 |
| 2016/0372442 A1 | 12/2016 | Han et al. | |
| 2018/0046012 A1 | 2/2018 | Miyamoto et al. | |
| 2018/0307084 A1* | 10/2018 | Lee | G02F 1/133308 |
| 2019/0101782 A1 | 4/2019 | Cao et al. | |
| 2019/0204669 A1 | 7/2019 | Lee et al. | |
| 2019/0361278 A1 | 11/2019 | Jia et al. | |
| 2020/0073502 A1 | 3/2020 | Kim et al. | |

FOREIGN PATENT DOCUMENTS

| | | |
|---|---|---|
| CN | 106886347 | 6/2017 |
| CN | 106950763 | 7/2017 |
| CN | 206470509 | 9/2017 |
| CN | 108153070 | 6/2018 |
| CN | 109212851 | 1/2019 |
| CN | 109448554 | 3/2019 |
| CN | 109559639 | 4/2019 |
| CN | 109785750 | 5/2019 |
| CN | 110109297 | 8/2019 |
| CN | 110109300 | 8/2019 |
| CN | 110277018 | 9/2019 |

OTHER PUBLICATIONS

Yim et al. "Design and Understanding of Anisotropic Conductive Films (ACFs) for LCD Packaging", The First IEEE International Symposium On Polymeric Electronics Packaging, Abstract, 3 P., Oct. 30, 1997.

* cited by examiner

LIQUID CRYSTAL DISPLAY MODULE AND DISPLAY DEVICE HAVING CONTACT SURFACE DISPOSED OBLIQUELY TO ANY SIDE SURFACE OF ARRAY SUBSTRATE

RELATED APPLICATIONS

This application is a National Phase of PCT Patent Application No. PCT/CN2019/117527 having International filing date of Nov. 12, 2019, which claims the benefit of priority of Chinese Patent Application No. 201910857234.0 filed on Sep. 11, 2019. The contents of the above applications are all incorporated by reference as if fully set forth herein in their entirety.

FIELD AND BACKGROUND OF THE INVENTION

The present disclosure relates to displays, and more particularly to a liquid crystal display module and a liquid crystal display device.

In conventional technologies, a narrow side frame is realized by using a side surface binding technology instead of an outer pin binding technology, but at the same time, a contact resistance between a binding terminal and a first conductive film is high. Further, a flip-chip film is needed to be bent at 90 degrees and is easily damaged.

Therefore, the existing side surface binding technology has a technical problem that the contact resistance of the side surface binding region is high.

SUMMARY OF THE INVENTION

The present application provides a liquid crystal display module and a liquid crystal display device, which are used to solve a technical problem of high contact resistance of a binding region in an existing side surface binding technology.

In order to solve the above problems, the technical solutions provided in this application are as follows:

An embodiment of the present application provides a liquid crystal display module comprising an array substrate and a color filter substrate disposed opposite to the array substrate, wherein end portions of the array substrate and the color filter substrate are provided with a side surface binding region, and the side surface binding region comprises:

a binding terminal disposed at an edge of the array substrate, wherein an end portion of the binding terminal is disposed flush with an end portion of the array substrate to expose externally, and wherein an end surface of the binding terminal is combined with an end surface of the array substrate to form a contact surface, and the contact surface is disposed obliquely to any side surface of the array substrate; and
  a conductive film fit to and electrically connected with the contact surface.

In the liquid crystal display module provided by the present application, an angle is formed between the contact surface and a plane on which the array substrate is located, and the angle is 30 degrees to 45 degrees.

In the liquid crystal display module provided by the present application, the conductive film comprises a first conductive film and a second conductive film, wherein the second conductive film is fit to an end of a flip-chip film, the first conductive film is filled between the binding terminal and the second conductive film, and a thickness of the first conductive film is greater than a thickness of the second conductive film.

In the liquid crystal display module provided by the present application, the contact surface comprises a first inclined surface and a second inclined surface, the first inclined surface and the second inclined surface are both end surfaces of the binding terminal, and compared with the second inclined surface, the first inclined surface is disposed near the array substrate.

In the liquid crystal display module provided by the present application, a first included angle is formed between the first inclined surface and a plane on which the array substrate is located, a second included angle is formed by the second inclined surface and the plane on which the array substrate is located, and the first included angle is between 30 degrees and 45 degrees.

In the liquid crystal display module provided by the present application, an angle of the first included angle is smaller than an angle of the second included angle.

In the liquid crystal display module provided by the present application, the contact surface further comprises a third inclined surface, the third inclined surface is an end surface of the array substrate, and a third included angle is formed between the third inclined surface and a plane on which the array substrate is located.

In the liquid crystal display module provided by the present application, an angle of the third included angle is smaller than an angle of the first included angle.

In the liquid crystal display module provided by the present application, the first conductive film and the second conductive film are respectively connected to two end surfaces of a flip-chip film, and the flip-chip film comprises at least two bending structures.

In the liquid crystal display module provided by the present application, the bending structures of the flip-chip film forms at least two included angles, and the included angles are both greater than 90 degrees.

An embodiment of the present application provides a liquid crystal display device comprising an array substrate and a color filter substrate disposed opposite to the array substrate, wherein end portions of the array substrate and the color filter substrate are provided with a side surface binding region, and the side surface binding region comprises:

a binding terminal disposed at an edge of the array substrate, wherein an end portion of the binding terminal is disposed flush with an end portion of the array substrate to expose externally, and wherein an end surface of the binding terminal is combined with an end surface of the array substrate to form a contact surface, and the contact surface is disposed obliquely to any side surface of the array substrate; and
  a conductive film fit to and electrically connected with the contact surface.

In the liquid crystal display device provided by the present application, an angle is formed between the contact surface and a plane on which the array substrate is located, and the angle is 30 degrees to 45 degrees.

In the liquid crystal display device provided by the present application, the conductive film comprises a first conductive film and a second conductive film, wherein the second conductive film is fit to an end of a flip-chip film, the first conductive film is filled between the binding terminal and the second conductive film, and a thickness of the first conductive film is greater than a thickness of the second conductive film.

In the liquid crystal display device provided by the present application, the contact surface comprises a first inclined surface and a second inclined surface, the first inclined surface and the second inclined surface are both end surfaces of the binding terminal, and compared with the second inclined surface, the first inclined surface is disposed near the array substrate.

In the liquid crystal display device provided by the present application, a first included angle is formed between the first inclined surface and a plane on which the array substrate is located, a second included angle is formed by the second inclined surface and the plane on which the array substrate is located, and the first included angle is between 30 degrees and 45 degrees.

In the liquid crystal display device provided by the present application, an angle of the first included angle is smaller than an angle of the second included angle.

In the liquid crystal display device provided by the present application, the contact surface further comprises a third inclined surface, the third inclined surface is an end surface of the array substrate, and a third included angle is formed between the third inclined surface and a plane on which the array substrate is located.

In the liquid crystal display device provided by the present application, an angle of the third included angle is smaller than an angle of the first included angle.

In the liquid crystal display device provided by the present application, the first conductive film and the second conductive film are respectively connected to two end surfaces of a flip-chip film, and the flip-chip film comprises at least two bending structures.

In the liquid crystal display device provided by the present application, the bending structures of the flip-chip film forms at least two included angles, and the included angles are both greater than 90 degrees.

Beneficial effects of the present application are that: the present application provides a liquid crystal display module and a liquid crystal display device. The liquid crystal display module comprises an array substrate and a color filter substrate disposed opposite to the array substrate. End portions of the array substrate and the color filter substrate are provided with a side surface binding region. The side surface binding region comprises: a binding terminal and a conductive film. The binding terminal is disposed at an edge of the array substrate, wherein an end portion of the binding terminal is disposed flush with an end portion of the array substrate to expose externally, and wherein an end surface of the binding terminal is combined with an end surface of the array substrate to form a contact surface, and the contact surface is disposed obliquely to any side surface of the array substrate. The conductive film is fit to and electrically connected with the contact surface. By increasing area of the contact surface between the binding terminal and the conductive film, a contact resistance can be effectively reduced. At the same time, in the side surface binding region, the flip-chip film is bent at least twice and has a bending angle greater than 90 degrees so as to reduce a damage to the flip-chip film during bending.

BRIEF DESCRIPTION OF THE SEVERAL VIEWS OF THE DRAWINGS

In order to more clearly describe technical solutions in embodiments or in conventional technologies, drawings required to be used for the embodiments in conventional technologies are simply described hereinafter. Apparently, the drawings described below only illustrate some embodiments of the present application. Those skilled in the art can obtain other drawings based on these drawings disclosed herein without creative effort.

DESCRIPTION OF SPECIFIC EMBODIMENTS OF THE INVENTION

The following description of the embodiments with reference to the appended drawings is used for illustrating specific embodiments which may be used for carrying out the present disclosure. The directional terms described by the present disclosure, such as "upper", "lower", "front", "back", "left", "right", "inner", "outer", "side", etc. are only directions by referring to the accompanying drawings. Thus, the used directional terms are used to describe and understand the present disclosure, but the present disclosure is not limited thereto. In figures, elements with similar structures are indicated with the same numbers.

For the existing side surface binding technology with a technical problem that the contact resistance of the side surface binding region is high, this embodiment of the present application can solve this problem.

Figure 1:
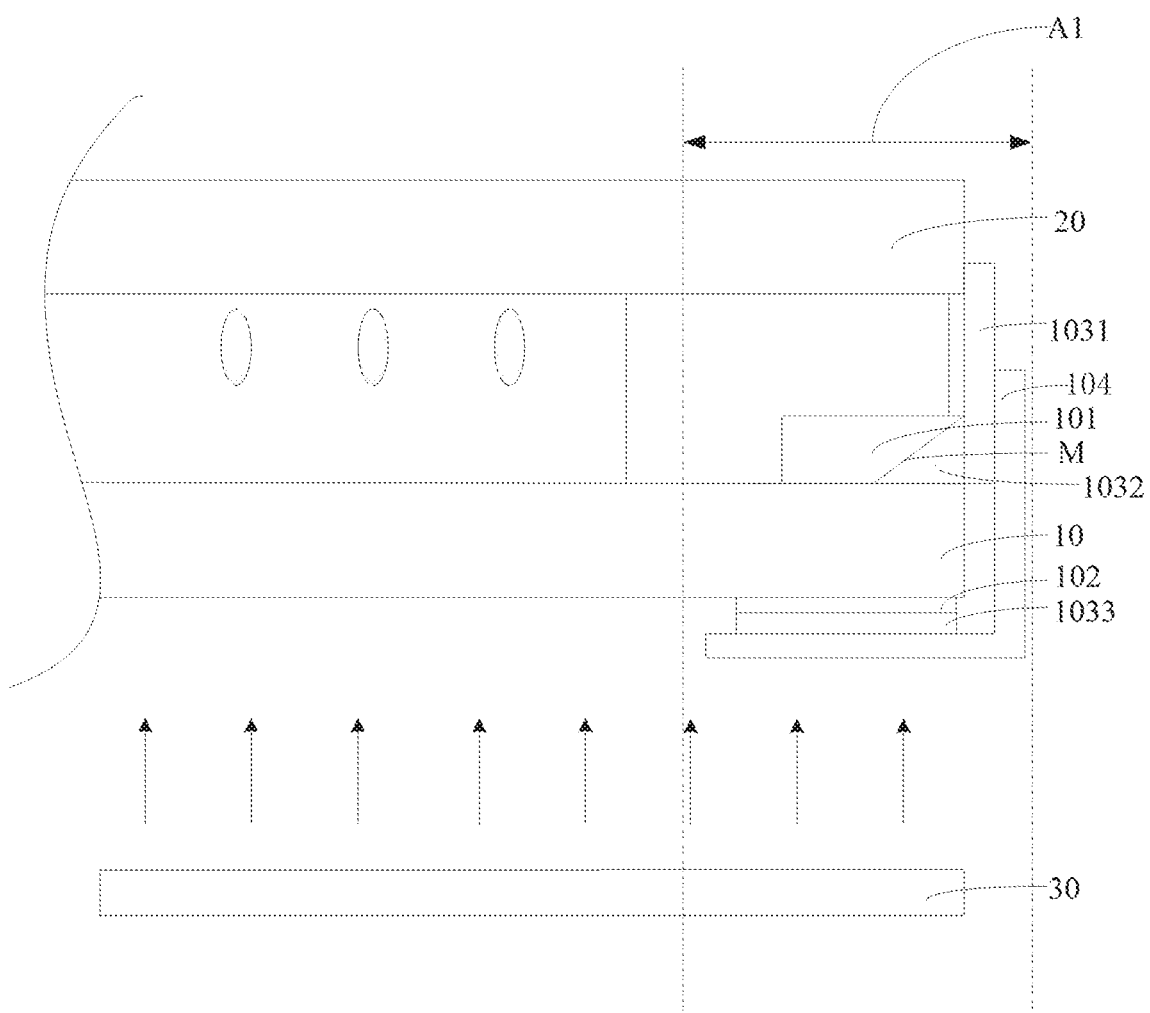
FIG. 1 is a first schematic cross-sectional view of a liquid crystal display module according to an embodiment of the present application.

As shown in FIG. 1, the present application provides a liquid crystal display module comprising an array substrate 10 and a color filter substrate 20 disposed opposite to the array substrate, wherein end portions of the array substrate 10 and the color filter substrate 20 are provided with a side surface binding region A1, and the side surface binding region A1 comprises a binding terminal 101, a printed circuit board 102, and a conductive film 103. The binding terminal 101 is disposed at an edge of the array substrate 10, wherein an end portion of the binding terminal 101 is disposed flush with an end portion of the array substrate 10 to expose externally, and wherein an end surface of the binding terminal 101 is combined with an end surface of the array substrate 10 to form a contact surface M, and the contact surface M is disposed obliquely to any side surface of the array substrate 10. The conductive film 103 is fit to and electrically connected with the contact surface M.

In the present embodiment, the liquid crystal display module comprises an array substrate 10 and a color filter substrate 20 disposed opposite to the array substrate, wherein end portions of the array substrate 10 and the color filter substrate 20 are provided with a side surface binding region A1, and the side surface binding region A1 comprises a binding terminal 101, a printed circuit board 102, and a conductive film 103. The binding terminal 101 is disposed at an edge of the array substrate 10, wherein an end portion of the binding terminal 101 is disposed flush with an end portion of the array substrate 10 to expose externally, and wherein an end surface of the binding terminal 101 is combined with an end surface of the array substrate 10 to form a contact surface M, and the contact surface M is disposed obliquely to any side surface of the array substrate 10. The conductive film 103 is fit to and electrically connected with the contact surface M. By increasing area of the contact surface between the binding terminal and the first conductive film, a contact resistance can be effectively reduced. At the same time, in the side surface binding region, the flip-chip film is bent at least twice and has a bending angle greater than 90 degrees so as to reduce a damage to the flip-chip film during bending.

In an embodiment, an angle is formed between the contact surface M and a plane on which the array substrate 10 is located, and the angle is 30 degrees to 45 degrees.

In an embodiment, the conductive film 103 comprises a first conductive film 1031 and a second conductive film 1032, wherein the second conductive film 1032 is fit to an end of a flip-chip film 104, the first conductive film 1031 is filled between the binding terminal 101 and the second conductive film 1032, and a thickness of the first conductive film 1031 is greater than a thickness of the second conductive film 1032.

In an embodiment, the contact surface M comprises a first inclined surface and a second inclined surface, the first inclined surface and the second inclined surface are both end surfaces of the binding terminal, and compared with the second inclined surface, the first inclined surface is disposed near the array substrate 10.

In an embodiment, a first included angle is formed between the first inclined surface and a plane on which the array substrate 10 is located, a second included angle is formed by the second inclined surface and the plane on which the array substrate is located, and the first included angle is between 30 degrees and 45 degrees.

In an embodiment, an angle of the first included angle is smaller than an angle of the second included angle.

In an embodiment, the contact surface M further comprises a third inclined surface, the third inclined surface is an end surface of the array substrate, and a third included angle is formed between the third inclined surface and a plane on which the array substrate is located.

In an embodiment, an angle of the third included angle is smaller than an angle of the first included angle.

In an embodiment, the first conductive film 1031 and the second conductive film 1032 are respectively connected to two end surfaces of a flip-chip film 104, and the flip-chip film 104 comprises at least two bending structures.

In an embodiment, the bending structures of the flip-chip film 104 forms at least two included angles, and the included angles are both greater than 90 degrees.

Figure 2:
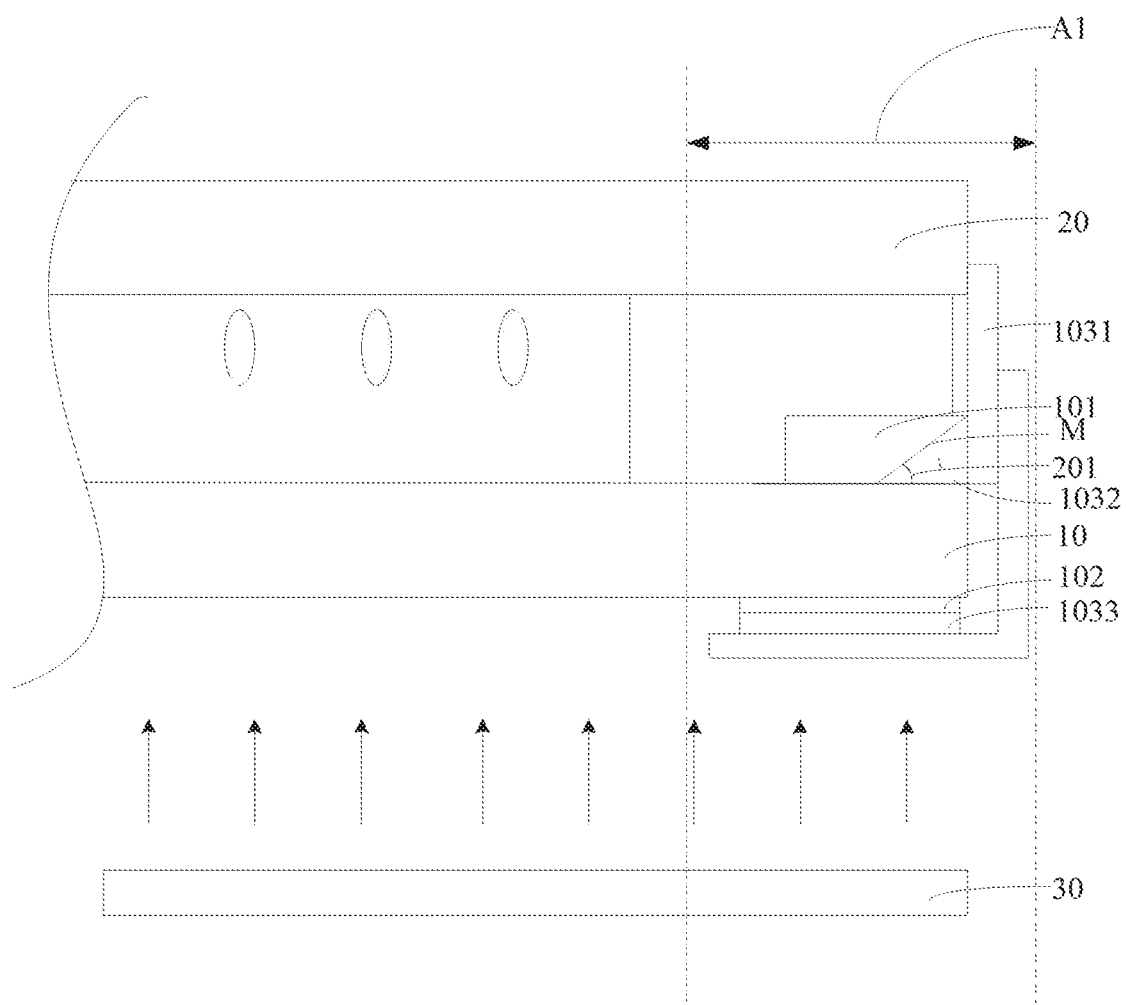
FIG. 2 is a second schematic cross-sectional view of a liquid crystal display module according to an embodiment of the present application.

In an embodiment, as shown in FIG. 2, the contact surface M forms an angle with the plane on which the array substrate 10 is located, and the angle is 30 degrees to 45 degrees.

Taking a direction away from the display region as a positive direction, an angle in the positive direction and between the contact surface M and the plane on which the array substrate 10 is located is an acute angle of 30 degrees to 45 degrees.

In an embodiment, as shown in FIG. 2, a thickness of the first conductive film 1031 is greater than a thickness of the third conductive film 1033. In a direction of the plane on which the array substrate 10 is located, the thickness of the first conductive film 1031 corresponding to a side of the binding terminal 101 is greater than the thickness of the third conductive film 1033.

Figure 3:
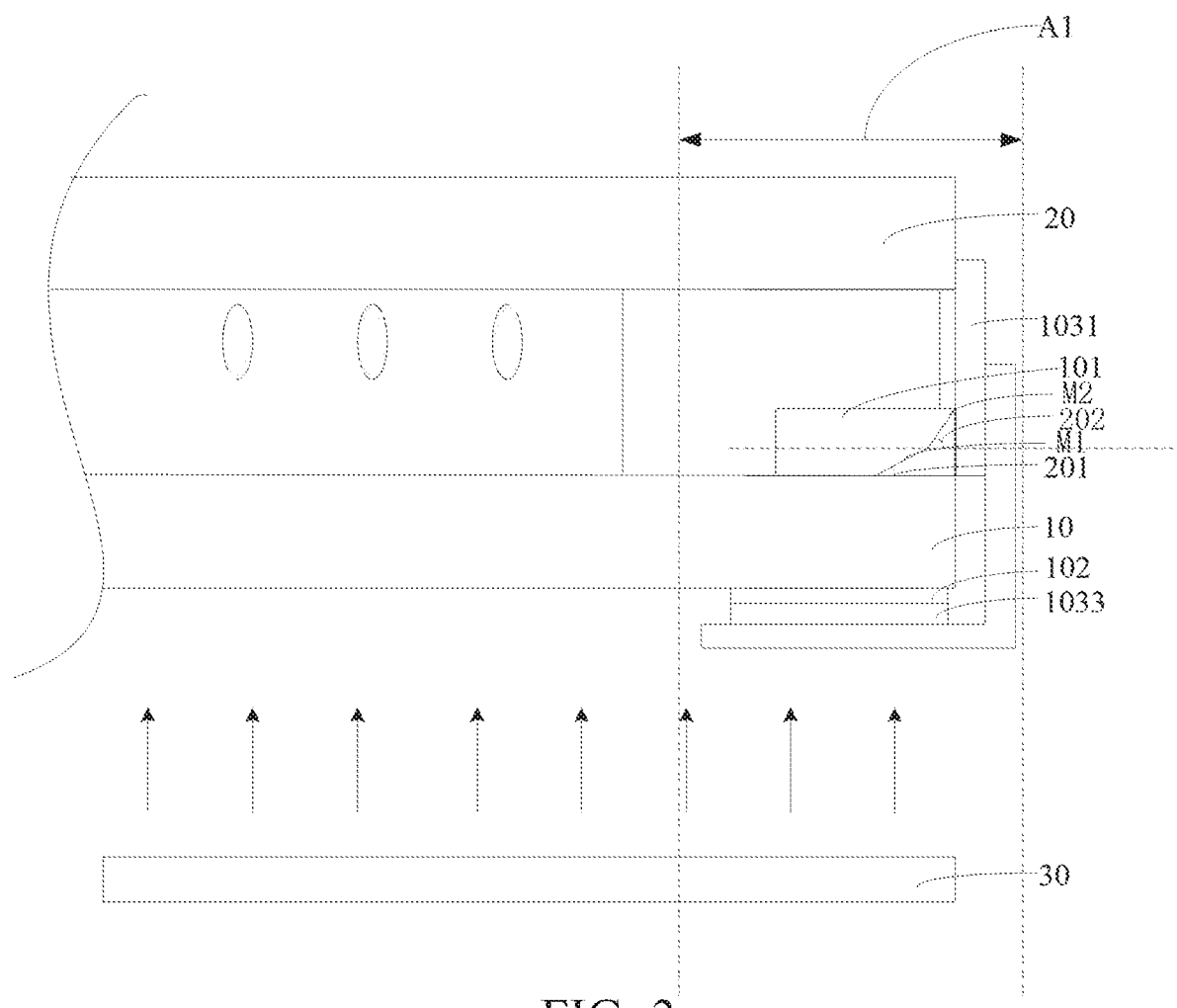
FIG. 3 is a third schematic cross-sectional view of a liquid crystal display module according to an embodiment of the present application.

In an embodiment, as shown in FIG. 3, the contact surface M includes a first inclined surface M1 and a second inclined surface M2. Compared with the second inclined surface M2, the first inclined surface M1 is close to the array substrate 10.

In an embodiment, as shown in FIG. 3, a first included angle 201 is formed between the first inclined surface M1 and a plane on which the array substrate 10 is located, a second included angle 202 is formed by the second inclined surface M2 and the plane on which the array substrate 10 is located, and the first included angle 201 is between 30 degrees and 45 degrees.

In one embodiment, as shown in FIG. 3, the first included angle 201 is smaller than the second included angle 202; and the first included angle 201 is smaller than the second included angle 202. Compared with a scheme that only an angle of the second included angle 202 is formed, an area of the contact surface M is greater, and the effect of reducing the contact resistance is better.

Figure 4:
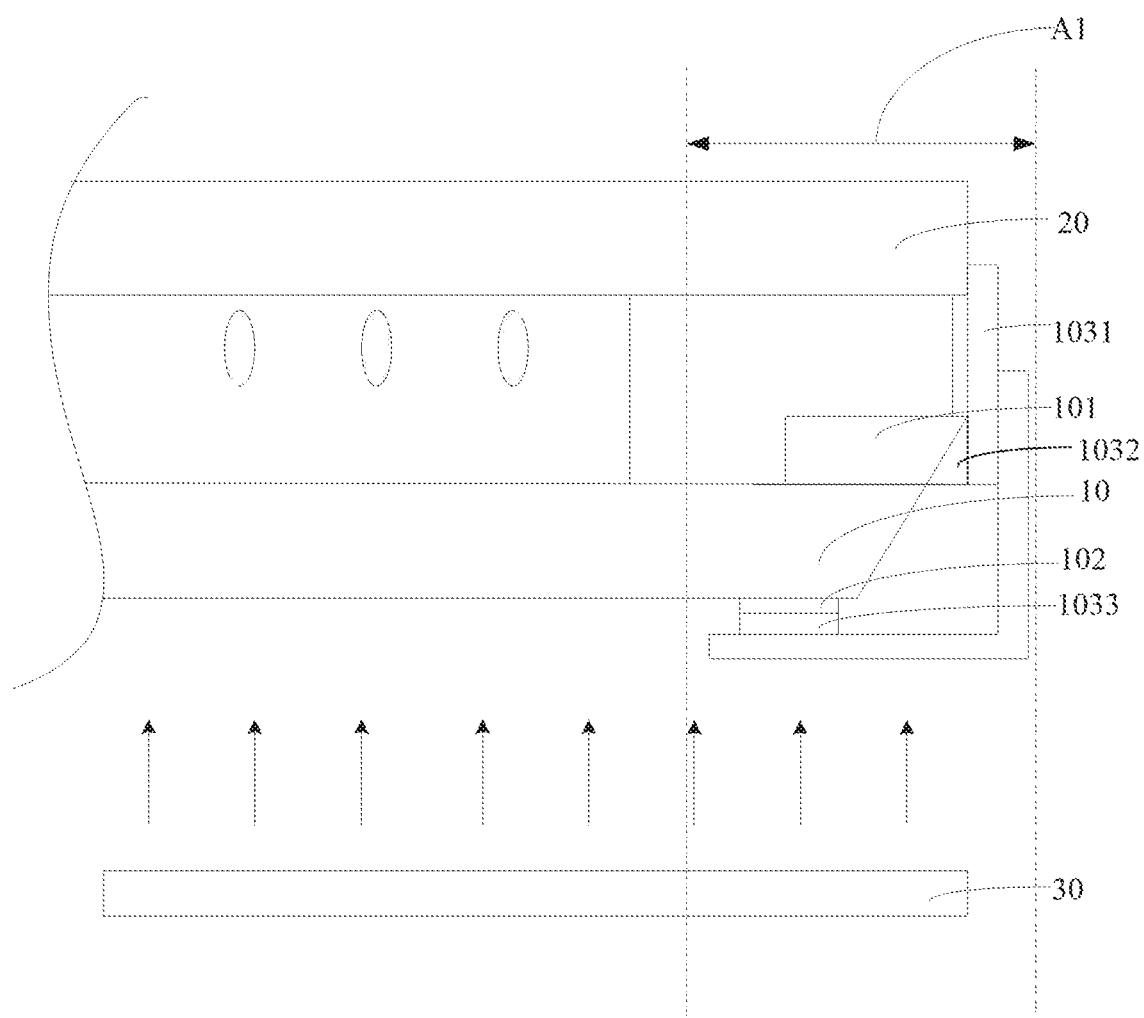
FIG. 4 is a fourth schematic cross-sectional view of a liquid crystal display module according to an embodiment of the present application.

In one embodiment, as shown in FIG. 4, a side surface of the array substrate 10 is an inclined surface, and a third included angle 203 is between the array substrate 10 and the plane on which the array substrate 10. The side surface of the array substrate 10 is an inclined surface, which can better bend the flip-chip film 104 to provide a structural basis for the multi-stage bending setting of the flip-chip film 104.

In one embodiment, an angle of the third included angle 203 is greater than an angle of the first included angle 201. A machining residual material is less, and the third included angle 203 is large, and a multi-stage bending setting can also be achieved.

Figure 5:
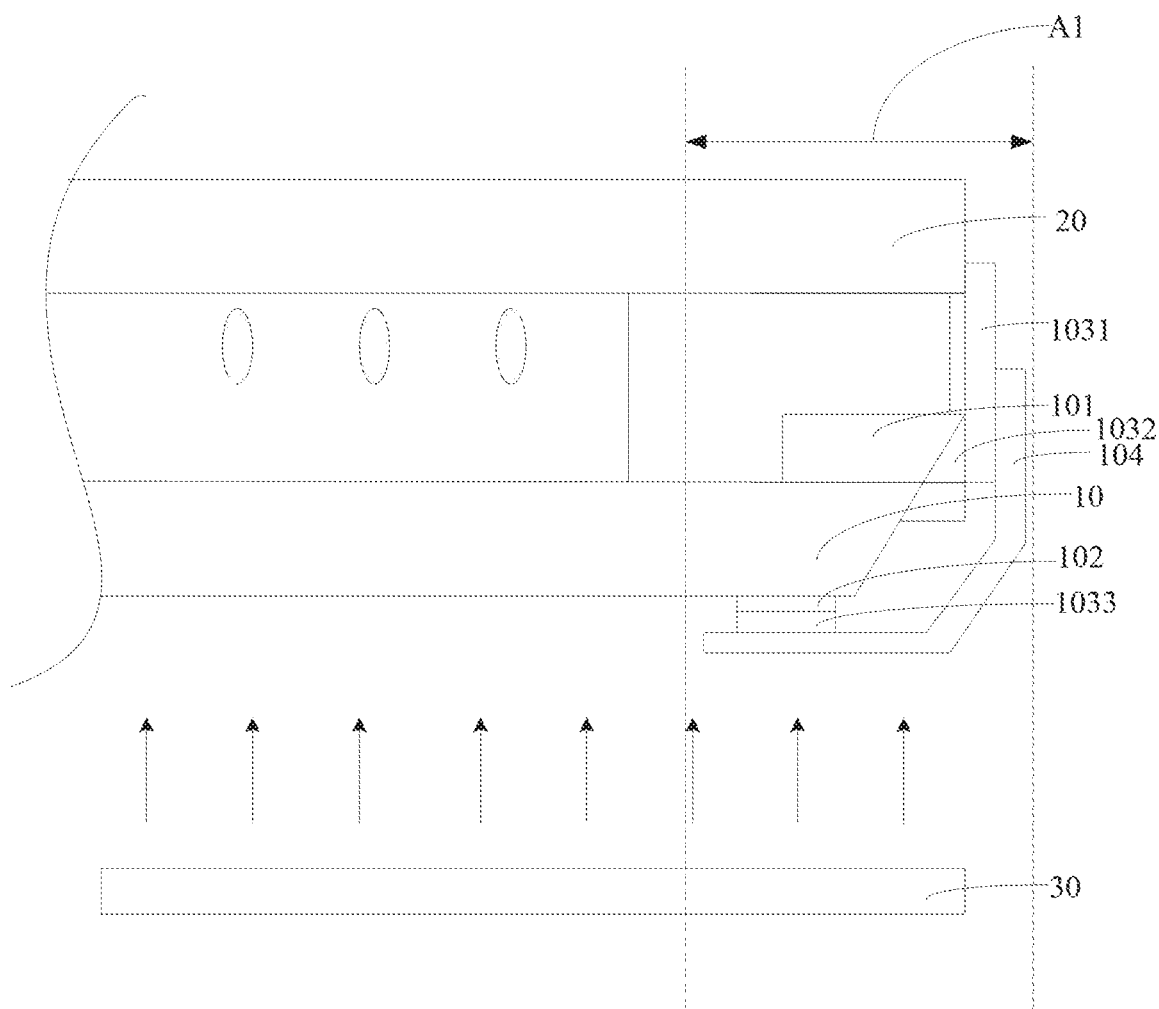
FIG. 5 is a fifth schematic cross-sectional view of a liquid crystal display module according to an embodiment of the present application.

In an embodiment, as shown in FIG. 5, the first conductive film 1031 and the third conductive film 1033 are respectively connected to two ends of the flip-chip film 104, and the flip-chip film 104 includes at least two sections of bending. Under a structure that the side surface of the array substrate 10 is an inclined surface, the flip-chip film 104 can be bent in multiple stages, and the two ends are respectively connected to the printed circuit board 102 and the binding terminal 101.

In an embodiment, as shown in FIG. 5, the bending forms at least two included angles, both of which are greater than 90 degrees. Compared with a one-section bending of a 90-degree angle, in the case of multi-stage bending and the included angle being greater than 90 degrees, when the panel is bent, a stress on the flip-chip film 104 can be effectively relieved and a service life can be extended.

Figure 6:
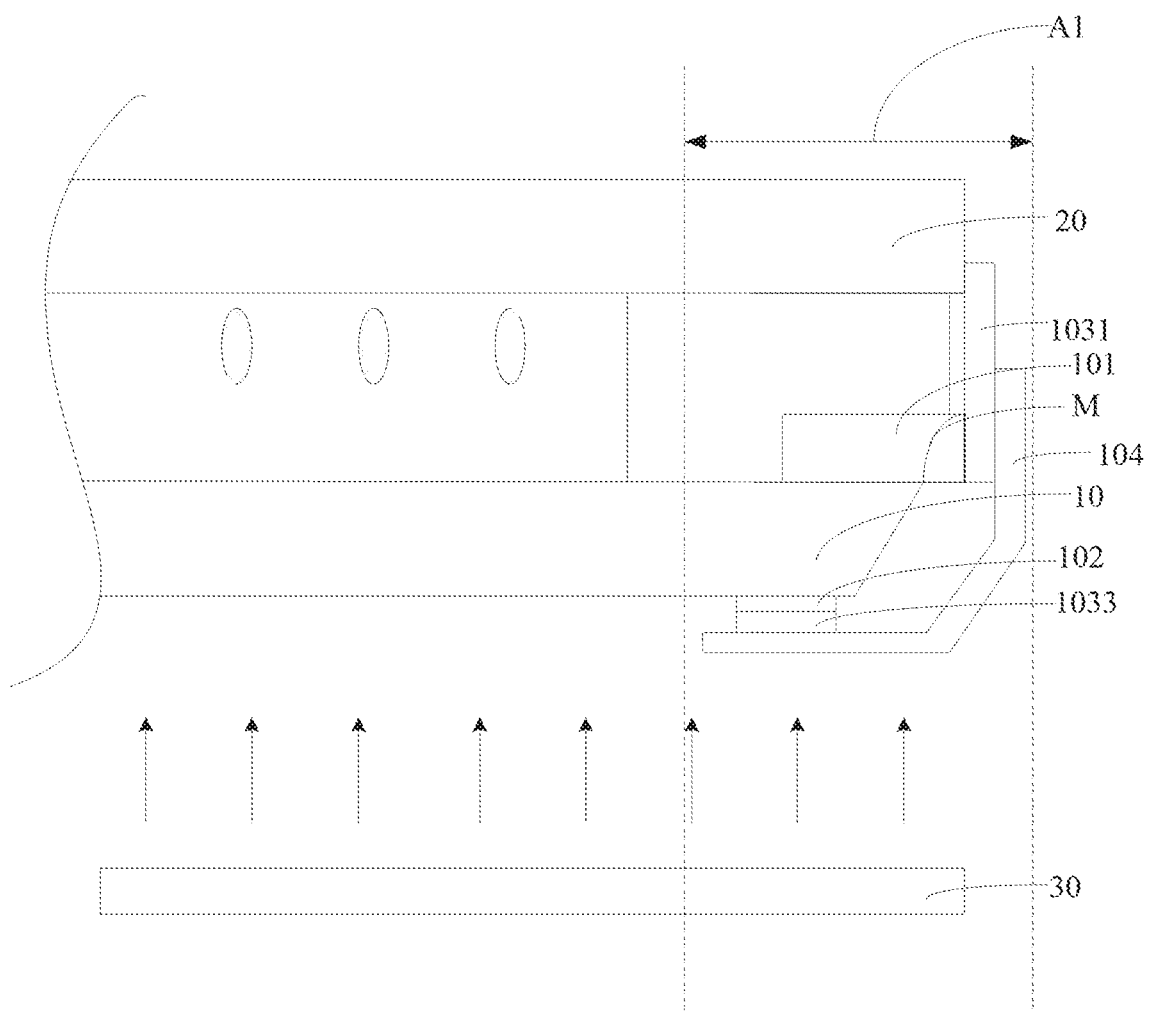
FIG. 6 is a sixth schematic cross-sectional view of a liquid crystal display module according to an embodiment of the present application.

In one embodiment, as shown in FIG. 6, the contact surface M of the binding terminal 101 and the first conductive film 1031 is a curved surface. An area of the curved contact surface M is greater than that of the inclined surface, and the effect of reducing the impedance is relatively good.

Figure 7:
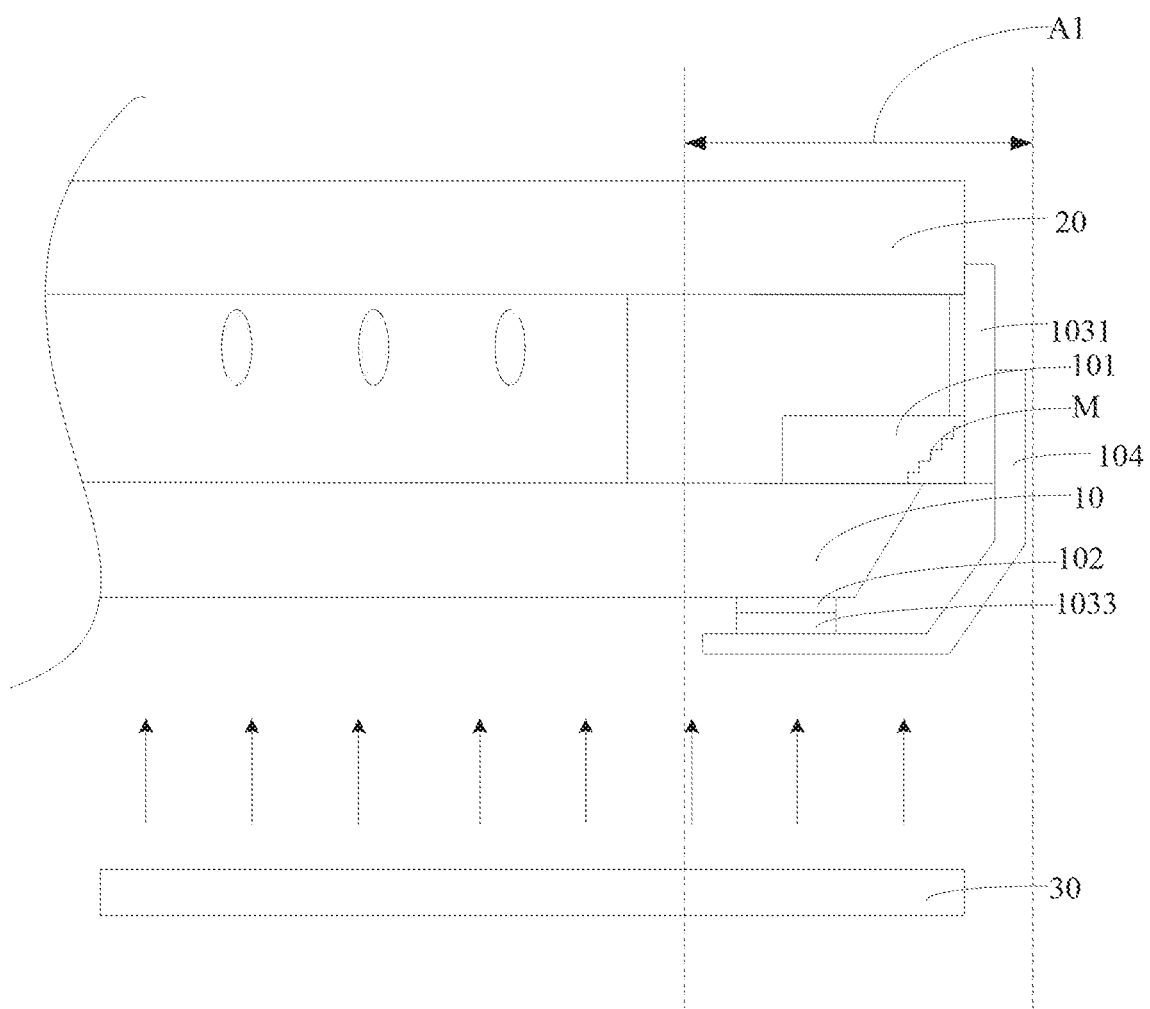
FIG. 7 is a seventh schematic cross-sectional view of a liquid crystal display module according to an embodiment of the present application.

In one embodiment, as shown in FIG. 7, the contact surface M of the binding terminal 101 and the first conductive film 1031 is step-shaped. According to a sum of two sides of the triangle is greater than a third side, an area of the step-shaped contact surface M is greater than an area of the inclined surface, and the effect of reducing the impedance is relatively good.

In one embodiment, as shown in FIG. 7, the contact surface M is step-shaped, and the steps are arranged at equal intervals, which is relatively easy to achieve through same process.

Figure 8:
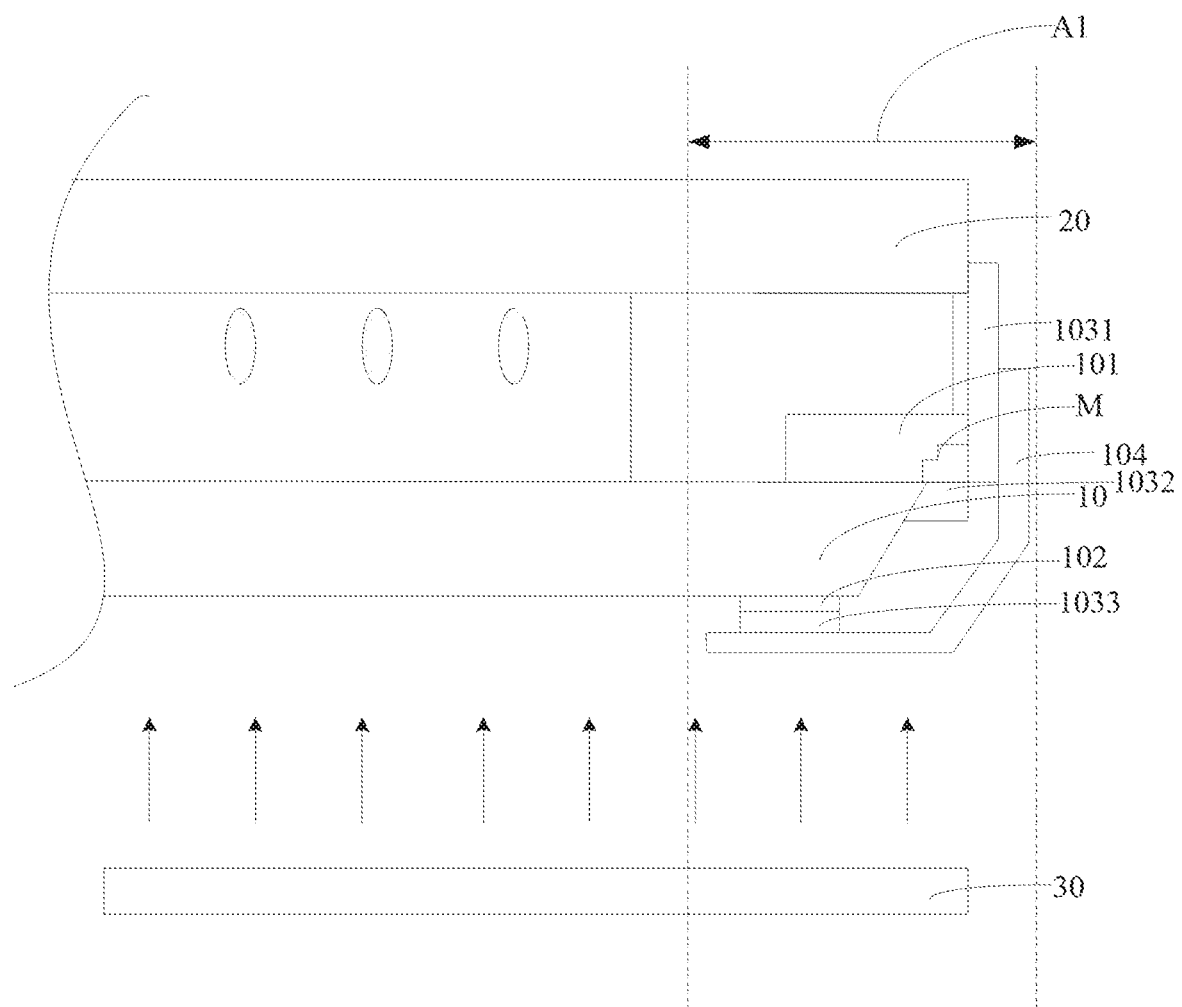
FIG. 8 is an eighth schematic cross-sectional view of a liquid crystal display module according to an embodiment of the present application.

In one embodiment, as shown in FIG. 8, the contact surface M is step-shaped, and the steps are arranged at uneven intervals.

In one embodiment, material of the conductive film 103 is a highly conductive material such as gold or silver.

In one embodiment, material of the conductive film 103 is copper or aluminum, which increases a contact area of the contact surface M, so as to reduce the material conductivity standard and to reduce the cost.

Figure 9:
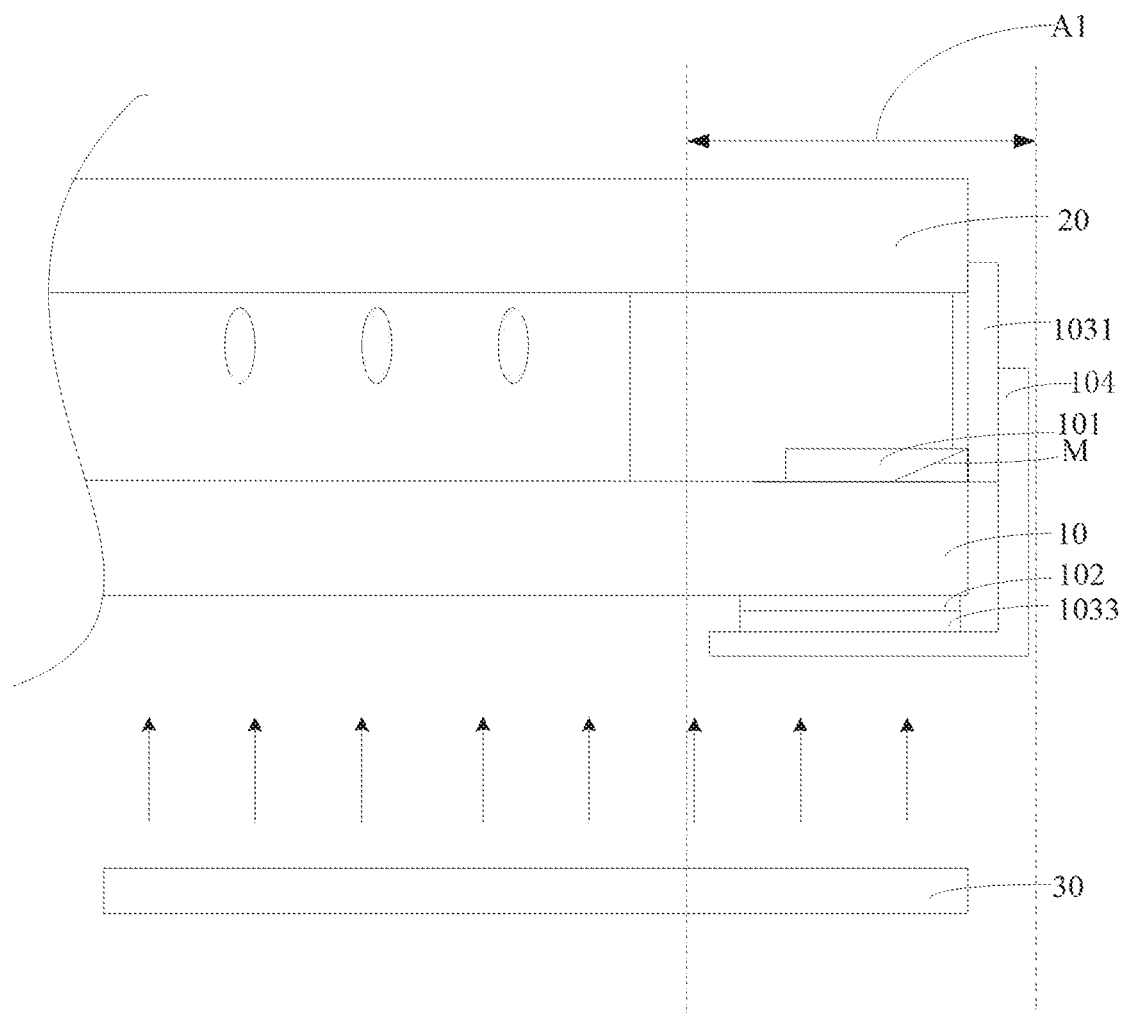
FIG. 9 is a ninth schematic cross-sectional view of a liquid crystal display module according to an embodiment of the present application.

In one embodiment, as shown in FIG. 9, in a direction of the backlight, a height of the binding terminal 101 becomes small, and a contact area of the contact surface M is increased, such that the impedance is unchanged or decreased, and a thickness of the panel is effectively reduced.

The liquid crystal display device provided in this application includes a liquid crystal display module. As shown in FIG. 1, the liquid crystal display module provided in this application includes an array substrate 10 and a color filter substrate 20 disposed opposite to the array substrate, wherein end portions of the array substrate 10 and the color filter substrate 20 are provided with a side surface binding region A1, and the side surface binding region A1 comprises a binding terminal 101, a printed circuit board 102, and a conductive film 103. The binding terminal 101 is disposed at an edge of the array substrate 10, wherein an end portion of the binding terminal 101 is disposed flush with an end portion of the array substrate 10 to expose externally, and wherein an end surface of the binding terminal 101 is combined with an end surface of the array substrate 10 to form a contact surface M, and the contact surface M is disposed obliquely to any side surface of the array substrate 10. The conductive film 103 is fit to and electrically connected with the contact surface M.

In the present embodiment, the liquid crystal display device comprises the liquid crystal display module. The liquid crystal display module comprises an array substrate 10 and a color filter substrate 20 disposed opposite to the array substrate, wherein end portions of the array substrate 10 and the color filter substrate 20 are provided with a side surface binding region A1, and the side surface binding region A1 comprises a binding terminal 101, a printed circuit board 102, and a conductive film 103. The binding terminal 101 is disposed at an edge of the array substrate 10, wherein an end portion of the binding terminal 101 is disposed flush with an end portion of the array substrate 10 to expose externally, and wherein an end surface of the binding terminal 101 is combined with an end surface of the array substrate 10 to form a contact surface M, and the contact surface M is disposed obliquely to any side surface of the array substrate 10. The conductive film 103 is fit to and electrically connected with the contact surface M. By increasing area of the contact surface between the binding terminal and the first conductive film, a contact resistance can be effectively reduced. At the same time, in the side surface binding region, the flip-chip film is bent at least twice and has a bending angle greater than 90 degrees so as to reduce a damage to the flip-chip film during bending.

In an embodiment of a liquid crystal display device, as shown in FIG. 2, a thickness of the first conductive film 1031 is greater than a thickness of the third conductive film 1033. In a direction of the plane on which the array substrate 10 is located, the thickness of the first conductive film 1031 corresponding to a side of the binding terminal 101 is greater than the thickness of the third conductive film 1033.

In an embodiment of a liquid crystal display device, as shown in FIG. 3, the contact surface M includes a first inclined surface M1 and a second inclined surface M2. Compared with the second inclined surface M2, the first inclined surface M1 is close to the array substrate 10.

In an embodiment of a liquid crystal display device, as shown in FIG. 3, a first included angle 201 is formed between the first inclined surface M1 and a plane on which the array substrate 10 is located, a second included angle 202 is formed by the second inclined surface M2 and the plane on which the array substrate 10 is located, and the first included angle 201 is between 30 degrees and 45 degrees.

In one embodiment of a liquid crystal display device, as shown in FIG. 3, the first included angle 201 is smaller than the second included angle 202; and the first included angle 201 is smaller than the second included angle 202. Compared with a scheme that only an angle of the second included angle 202 is formed, an area of the contact surface M is greater, and the effect of reducing the contact resistance is better.

In one embodiment of a liquid crystal display device, as shown in FIG. 4, a side surface of the array substrate 10 is an inclined surface, and a third included angle 203 is between the array substrate 10 and the plane on which the array substrate 10. The side surface of the array substrate 10 is an inclined surface, which can better bend the flip-chip film 104 to provide a structural basis for the multi-stage bending setting of the flip-chip film 104.

In one embodiment of a liquid crystal display device, an angle of the third included angle 203 is greater than an angle of the first included angle 201. A machining residual material is less, and the third included angle 203 is large, and a multi-stage bending setting can also be achieved.

In an embodiment of a liquid crystal display device, as shown in FIG. 5, the first conductive film 1031 and the third conductive film 1033 are respectively connected to two ends of the flip-chip film 104, and the flip-chip film 104 includes at least two sections of bending. Under a structure that the side surface of the array substrate 10 is an inclined surface, the flip-chip film 104 can be bent in multiple stages, and the two ends are respectively connected to the printed circuit board 102 and the binding terminal 101.

In an embodiment of a liquid crystal display device, as shown in FIG. 5, the bending forms at least two included angles, both of which are greater than 90 degrees. Compared with a one-section bending of a 90-degree angle, in the case of multi-stage bending and the included angle being greater than 90 degrees, when the panel is bent, a stress on the flip-chip film 104 can be effectively relieved and a service life can be extended.

In one embodiment of a liquid crystal display device, as shown in FIG. 6, the contact surface M of the binding terminal 101 and the first conductive film 1031 is a curved surface. An area of the curved contact surface M is greater than that of the inclined surface, and the effect of reducing the impedance is relatively good.

In one embodiment of a liquid crystal display device, as shown in FIG. 7, the contact surface M of the binding terminal 101 and the first conductive film 1031 is step-shaped. According to a sum of two sides of the triangle is greater than a third side, an area of the step-shaped contact surface M is greater than an area of the inclined surface, and the effect of reducing the impedance is relatively good.

In one embodiment of a liquid crystal display device, as shown in FIG. 7, the contact surface M is step-shaped, and the steps are arranged at equal intervals, which is relatively easy to achieve through same process.

In one embodiment of a liquid crystal display device, as shown in FIG. 8, the contact surface M is step-shaped, and the steps are arranged at uneven intervals.

In one embodiment of a liquid crystal display device, material of the conductive film 103 is a highly conductive material such as gold or silver.

In one embodiment of a liquid crystal display device, material of the conductive film 103 is copper or aluminum, which increases a contact area of the contact surface M, so as to reduce the material conductivity standard and to reduce the cost.

In one embodiment of a liquid crystal display device, as shown in FIG. 9, in a direction of the backlight, a height of the binding terminal 101 becomes small, and a contact area of the contact surface M is increased, such that the impedance is unchanged or decreased, and a thickness of the panel is effectively reduced.

Figure 10:
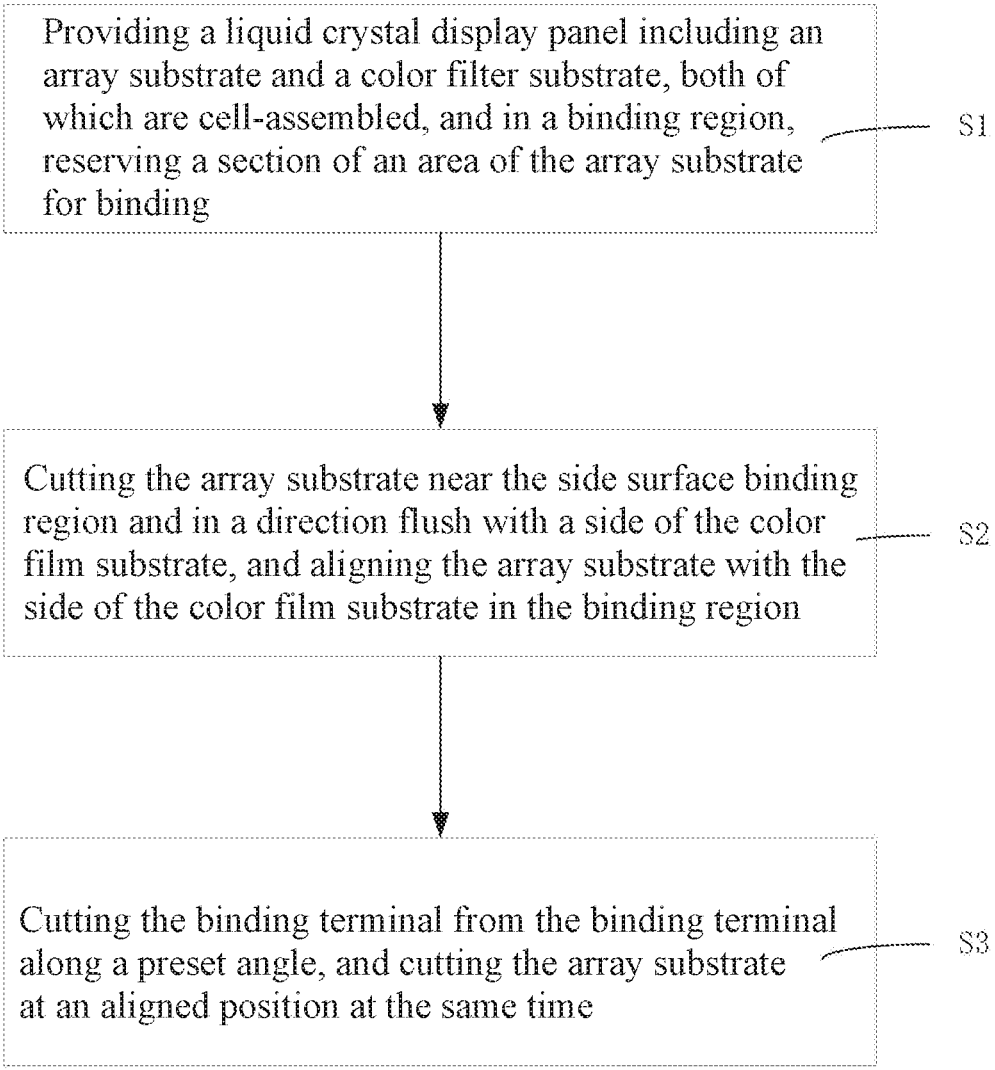
FIG. 10 is a schematic flowchart of a side surface binding technology edging method according to an embodiment of the present application.

As shown in FIG. 10, a side surface binding technology edging method provided in this application includes:

In step S1, a liquid crystal display panel is provided, which includes an array substrate 10 and a color filter substrate 20 both of which are cell-assembled, and in a side binding region A1, a section of an area of the array substrate 10 is reserved for binding.

In step S2, the array substrate 10 is cut near the side surface binding region A1 and in a direction flush with a side of the color film substrate 20, so that the array substrate 10 and the side of the color film substrate 20 in the side surface binding region A1 are aligned.

In step S3, the binding terminal 101 is cut from the binding terminal 101 along a preset angle, and the array substrate 10 at an aligned position is cut at the same time.

According to the above embodiment:

The present application provides a liquid crystal display module. The liquid crystal display module comprises an array substrate and a color filter substrate disposed opposite to the array substrate. End portions of the array substrate and the color filter substrate are provided with a side surface binding region. The side surface binding region comprises: a binding terminal and a conductive film. The binding terminal is disposed at an edge of the array substrate, wherein an end portion of the binding terminal is disposed flush with an end portion of the array substrate to expose externally, and wherein an end surface of the binding terminal is combined with an end surface of the array substrate to form a contact surface, and the contact surface is disposed obliquely to any side surface of the array substrate. The conductive film is fit to and electrically connected with the contact surface. By increasing area of the contact surface between the binding terminal and the first conductive film, a contact resistance can be effectively reduced. At the same time, in the binding region, the flip-chip film is bent at least twice and has a bending angle greater than 90 degrees so as to reduce a damage to the flip-chip film during bending.

As described above, although the present application has been described in preferred embodiments, they are not intended to limit the application. One of ordinary skill in the art, without departing from the spirit and scope of the application within, can make various modifications and variations, so the range of the scope of the application is defined by the claims.

What is claimed is:

1. A liquid crystal display module, comprising an array substrate and a color filter substrate disposed opposite to the array substrate, wherein end portions of the array substrate and the color filter substrate are provided with a side surface binding region, and the side surface binding region comprises:
   a binding terminal disposed at an edge of the array substrate, wherein an end portion of the binding terminal is disposed flush with an end portion of the array substrate to expose externally, and wherein an end surface of the binding terminal is combined with an end surface of the array substrate to form a contact surface, and the contact surface is disposed obliquely to any side surface of the array substrate; and
   a conductive film attached to and electrically connected with the contact surface,
   wherein the conductive film comprises a first conductive film and a second conductive film, the first conductive film and the second conductive film are respectively connected to two end surfaces of a flip-chip film, and the flip-chip film comprises at least two bending structures between the two end surfaces.

2. The liquid crystal display module according to claim 1, wherein an angle is formed between the contact surface and a plane on which the array substrate is located, and the angle is 30 degrees to 45 degrees.

3. The liquid crystal display module according to claim 1, wherein the second conductive film is fit to an end of the flip-chip film, the first conductive film is filled between the binding terminal and the second conductive film, and a thickness of the first conductive film is greater than a thickness of the second conductive film.

4. The liquid crystal display module according to claim 1, wherein the contact surface comprises a first inclined surface and a second inclined surface, the first inclined surface and the second inclined surface are both end surfaces of the binding terminal, and compared with the second inclined surface, the first inclined surface is disposed near the array substrate.

5. The liquid crystal display module according to claim 4, wherein a first included angle is formed between the first inclined surface and a plane on which the array substrate is located, a second included angle is formed by the second inclined surface and the plane on which the array substrate is located, and the first included angle is between 30 degrees and 45 degrees.

6. The liquid crystal display module according to claim 5, wherein an angle of the first included angle is smaller than an angle of the second included angle.

7. The liquid crystal display module according to claim 1, wherein the contact surface further comprises a third inclined surface, the third inclined surface is an end surface of the array substrate, and a third included angle is formed between the third inclined surface and a plane on which the array substrate is located.

8. The liquid crystal display module according to claim 7, wherein an angle of the third included angle is smaller than an angle of the first included angle.

9. The liquid crystal display module according to claim 1, wherein the bending structures of the flip-chip film forms at least two included angles, and the included angles are both greater than 90 degrees.

10. A liquid crystal display device, comprising an array substrate and a color filter substrate disposed opposite to the array substrate, wherein end portions of the array substrate and the color filter substrate are provided with a side surface binding region, and the side surface binding region comprises:
- a binding terminal disposed at an edge of the array substrate, wherein an end portion of the binding terminal is disposed flush with an end portion of the array substrate to expose externally, and wherein an end surface of the binding terminal is combined with an end surface of the array substrate to form a contact surface, and the contact surface is disposed obliquely to any side surface of the array substrate; and
- a conductive film attached to and electrically connected with the contact surface,
- wherein the conductive film comprises a first conductive film and a second conductive film, the first conductive film and the second conductive film are respectively connected to two end surfaces of a flip-chip film, and the flip-chip film comprises at least two bending structures between the two end surfaces.

11. The liquid crystal display device according to claim 10, wherein an angle is formed between the contact surface and a plane on which the array substrate is located, and the angle is 30 degrees to 45 degrees.

12. The liquid crystal display device according to claim 10, wherein the second conductive film is fit to an end of the flip-chip film, the first conductive film is filled between the binding terminal and the second conductive film, and a thickness of the first conductive film is greater than a thickness of the second conductive film.

13. The liquid crystal display device according to claim 10, wherein the contact surface comprises a first inclined surface and a second inclined surface, the first inclined surface and the second inclined surface are both end surfaces of the binding terminal, and compared with the second inclined surface, the first inclined surface is disposed near the array substrate.

14. The liquid crystal display device according to claim 13, wherein a first included angle is formed between the first inclined surface and a plane on which the array substrate is located, a second included angle is formed by the second inclined surface and the plane on which the array substrate is located, and the first included angle is between 30 degrees and 45 degrees.

15. The liquid crystal display device according to claim 14, wherein an angle of the first included angle is smaller than an angle of the second included angle.

16. The liquid crystal display device according to claim 10, wherein the contact surface further comprises a third inclined surface, the third inclined surface is an end surface of the array substrate, and a third included angle is formed between the third inclined surface and a plane on which the array substrate is located.

17. The liquid crystal display device according to claim 16, wherein an angle of the third included angle is smaller than an angle of the first included angle.

18. The liquid crystal display device according to claim 10, wherein the bending structures of the flip-chip film forms at least two included angles, and the included angles are both greater than 90 degrees.

* * * * *